(12) United States Patent
Foster

(10) Patent No.: US 8,151,014 B2
(45) Date of Patent: Apr. 3, 2012

(54) RAID PERFORMANCE USING COMMAND DESCRIPTOR BLOCK POINTER FORWARDING TECHNIQUE

(75) Inventor: Joseph E. Foster, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 501 days.

(21) Appl. No.: 11/242,089

(22) Filed: Oct. 3, 2005

(65) Prior Publication Data

US 2007/0088864 A1  Apr. 19, 2007

(51) Int. Cl.
*G06F 13/00* (2006.01)
*G06F 9/312* (2006.01)

(52) U.S. Cl. .................................. 710/22; 711/166
(58) Field of Classification Search ............ 710/22, 710/314; 709/227, 230; 711/114
See application file for complete search history.

(56) References Cited

U.S. PATENT DOCUMENTS

| | | | |
|---|---|---|---|
| 5,504,868 A | | 4/1996 | Krakirian |
| 5,892,969 A | * | 4/1999 | Young .............................. 710/5 |
| 6,072,781 A | * | 6/2000 | Feeney et al. ................. 370/282 |
| 6,094,699 A | * | 7/2000 | Surugucchi et al. .......... 710/314 |
| 6,738,821 B1 | * | 5/2004 | Wilson et al. ................. 709/230 |
| 6,772,310 B2 | * | 8/2004 | Thompson et al. ........... 711/166 |
| 6,785,835 B2 | | 8/2004 | MacLaren et al. |
| 6,807,605 B2 | | 10/2004 | Umberger et al. |
| 6,851,023 B2 | * | 2/2005 | Noya et al. .................... 711/114 |
| 6,886,074 B1 | | 4/2005 | Narayanaswamy et al. |
| 7,711,871 B1 | * | 5/2010 | Haechten et al. ............... 710/29 |
| 2005/0235072 A1 | * | 10/2005 | Smith et al. ...................... 710/22 |
| 2006/0235977 A1 | * | 10/2006 | Wunderlich et al. .......... 709/227 |

* cited by examiner

*Primary Examiner* — Henry Tsai
*Assistant Examiner* — Titus Wong

(57) ABSTRACT

The apparatus in one example may have: at first and second processing devices; at least one sequence of processes for the first and second devices; the at least one sequence having a command forward instruction such that, after the first processing device completes processing a first process of the at least one sequence of processes, the first processing device forwards, without producing an interrupt, the command forward instruction to the second processing device to effect processing of a second process of the at least one sequence of processes.

15 Claims, 3 Drawing Sheets

RAID PERFORMANCE USING COMMAND DESCRIPTOR BLOCK POINTER FORWARDING TECHNIQUE

BACKGROUND

"RAID" stands for Redundant Array of Independent Disks and is a method of storing data on multiple hard disks. When disks are arranged in a RAID configuration, the computer sees them all as one large disk. However, they operate much more efficiently than a single hard drive. Since the data is spread out over multiple disks, the reading and writing operations can take place on multiple disks at once. This can speed up hard drive access time significantly.

To date, many different levels of RAID have been introduced. Of these RAID levels RAID 0, 1, 5, & 6 are common in industry. RAID 0 implements a performance oriented data striping technique. RAID 1 utilized mirrored storage devices. In other words, data was written identically to at least two disks. Thus, if one disk failed, the data could be retrieved from one of the other disks. Of course, a level 1 RAID system requires the cost of an additional disk without increasing overall capacity in exchange for decreased likelihood of data loss. RAID 5 introduced a parity protection scheme with that addition of one disk. Data and parity striping techniques are applied where data and parity information are distributed throughout the disk array. RAID 6 is an extension to RAID 5 supporting multiple simultaneous disk failures.

In today's RAID controllers, for example, a DMA (Direct Memory Access) engine performs a portion of a RAID operation while a SAS (Serial Attached SCSI (Small Computer System Interface)) core performs the remainder of the operation. A significant amount of CPU (Central Processing Unit) overhead is involved coordinating the DMA engine operations with the SAS core operations. This limits overall performance. The term "SAS core" refers to the firmware or hardware that implements the SAS.

SUMMARY

In one implementation an apparatus comprises at least first and second processing devices; at least one sequence of processes for the first and second devices; at least one sequence having a command forward instruction such that, after the first processing device completes processing a first process of the at least one sequence of processes, the first processing device forwards, without producing an interrupt, the command forward instruction to the second processing device to effect processing of a second process of the at least one sequence of process.

DESCRIPTION OF THE DRAWINGS

Features of exemplary implementations of the invention will become apparent from the description, the claims, and the accompanying drawings in which:

DETAILED DESCRIPTION

Figure 1:
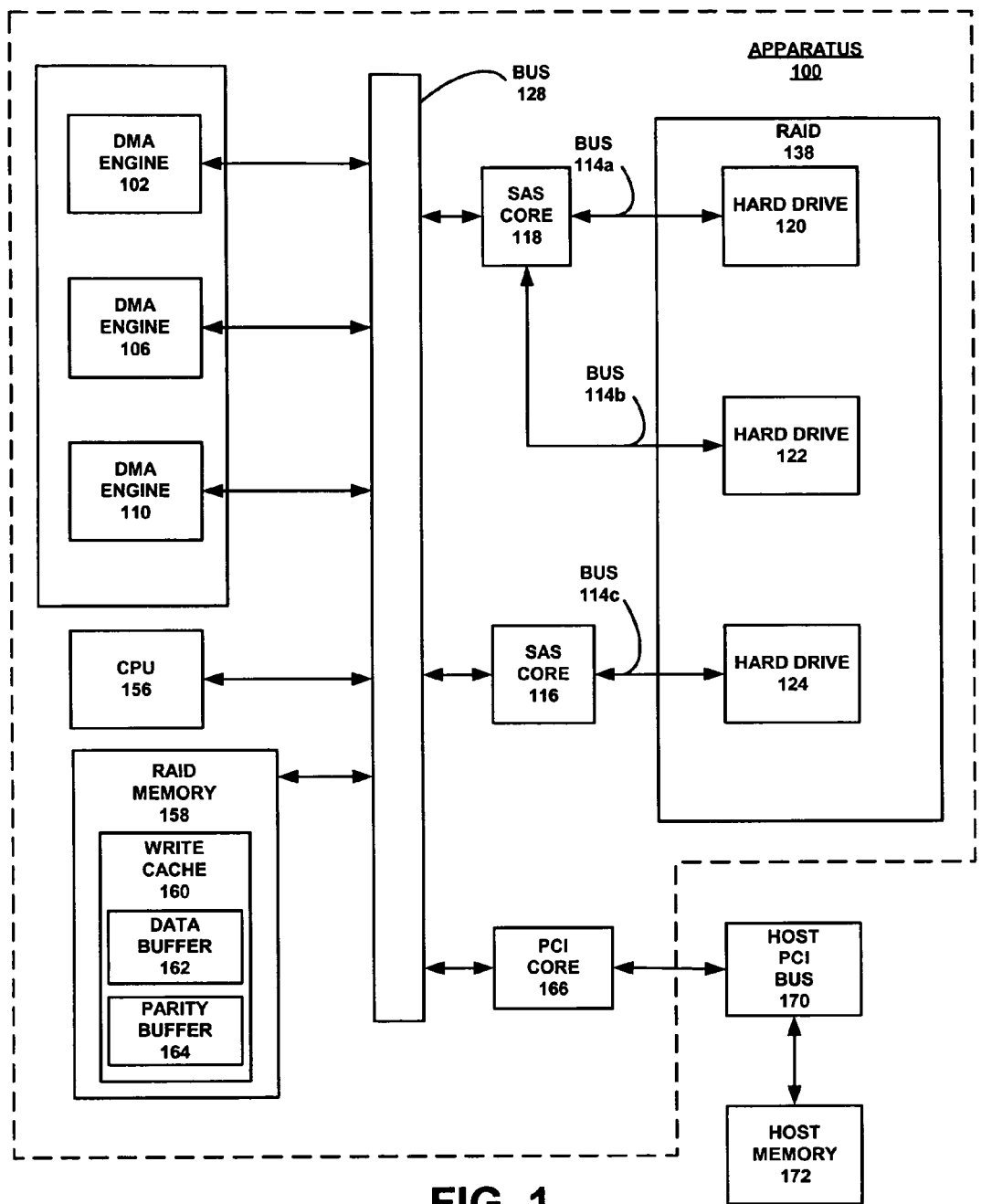
FIG. 1 is a representation of one implementation of an apparatus that comprises improved RAID performance.

A DMA is specialized circuitry or a dedicated microprocessor that transfers data from memory to memory without using a CPU, such as an IOP (Input Output Processor). Although the DMA may periodically steal cycles from the CPU to manage the DMA operations, data is transferred much faster than using the CPU for every byte of transfer. Multiple DMAs may be part of an ASIC (Application Specific Integrated Circuit).

These components may be operatively coupled by a SAS, which may be a serial I/O bus and protocol that permits the connection of a variety of peripherals including disk drives and tape drives to a host computer.

Embodiments of the present method and apparatus use CDB (Command Descriptor Block) forwarding to enable stand-alone DMA engines and SAS core based DMA engines on completion of a task to push a CDB pointer to other DMA engines. In general a CDB is a table of information in memory that the DMA engine and the SAS core need in order to know what to do.

In general in an embodiment of the present method and apparatus, the CPU programs the DMA engine by building CDBs, which is part of the sequence of processes. It is to be understood that there may be more than one CDB in the sequence of processes depending upon the desired programming of the DMA engine. For example, the CPU may program the DMA engine for moving data, as well as, programming the SAS core for execution after the DMA engine has finished its task.

Thus the CPU in this example has built up CDBs to instruct the DMA engine what tasks to perform, and then submits to the DMA engine pointers to the CDBs. For example, one of the CDBs may be a move immediate command, or have in it a command that instructs the DMA engine to notify the SAS core when the DMA engine has finished executing its commands, such as the move immediate command. Thus, the SAS core then executes its commands and an interrupt of the CPU is eliminated.

A more detailed embodiment is given below in Table 2, for example.

Different implementations of the above sequence of process may occur. For example a CDB, which causes execution of a memory to memory move, may have an extra field, which indicates to the DMA engine that when the DMA engine has completed the memory to memory move, the DMA engine is to execute the move immediate command.

Alternately, a separate command may be inserted in the sequence of process by the CPU when the CPU creates the sequence of process.

As explained above, in typical RAID controllers, the DMA engine performs a portion of a RAID operation while the SAS core performs the remainder of the operation. Significant amount of CPU overhead is involved coordinating the DMA engine operations with the SAS core operations resulting in limited overall performance.

Embodiments of the present method and apparatus enable one DMA engine to complete its portion of the RAID process and forward to the SAS core a CDB pointer for the SAS core to complete it's portion of the RAID operation without CPU intervention. The reverse is also true. When the SAS core completes its portion of a RAID operation it forwards to the DMA Engine a CDB pointer.

The net result is that complex DMA and disk drive sequences used in RAID can be implemented without CPU intervention. It also allows the DMA Engine and the SAS core to have vendor/function unique CDB and still operate together without CPU intervention. Typically, in a RAID function the data, which the SAS core is supposed to write to a disc drive, is in the RAID CPU memory transfer buffer. To accomplish this, the data is copied to a temporary transfer buffer in RAID memory with a DMA engine. The data is then moved from the temporary transfer buffer to the drive with a SAS core. In known systems an IOP, which is basically a CPU, after the first DMA transfer, takes an interrupt, builds up the next CDB, and then schedules the SAS core for the move.

In embodiments of the present method and apparatus the CPU may build up two different CDBs, one for the DMA engine to do the data move to the temporary buffer, and one for the SAS core to take data from the temporary buffer and place it on the SAS drive.

Thus, the CPU builds both of the CDBs and when the DMA engine finishes with its part, the DMA engine may inform the SAS core. The SAS core then performs its part and when the SAS core is finished, the SAS core interrupts the CPU. Thus, instead of two CPU interrupts for essentially one operation, there is now only one interrupt.

Turning to FIG. 1, an apparatus 100 in one example may have at least first and second processing devices, such as DMA engine 102 and SAS core 116, and at least one sequence of processes for the first and second devices. At least one sequence may have a command forward instruction such that, after the first processing device completes processing a first process of the at least one sequence of processes, the first processing device performs the command forward instruction informing the second processing device to effect processing of a second process of the at least one sequence of process.

As one example, a bus 128 may have operatively coupled thereto DMA engines 102, 106, 110. Also, operatively coupled to the bus 128 may be SAS cores 116, 118. A RAID 138 may have hard drives 120, 122, 124 operatively coupled to the SAS cores 116, 118 via SAS bus 114a, 114b, and 114c. Various embodiments may thus have one or more DMA engines and/or SAS cores operatively coupled to the bus.

The apparatus 100 may also have, as explained below, a CPU 156 and a RAID memory 158 operatively coupled to the bus 128. The RAID memory 158 may have a read/write cache 160 with a transfer buffer 162 and a parity buffer 164. Also operatively coupled to the bus 128 may be a PCI core 166. The PCI core may be operatively coupled to a host PCI bus 170 that in turn is operatively coupled to a host memory 172.

In one embodiment, each of the at least first and second processing devices may be one of: a DMA engine and a SAS core respectively, such as 102 and 116; only DMA engines, such as 102, 106, 110; or only SAS cores, such as 116 and 118.

In another embodiment a RAID 138 may be operatively coupled to at least first and second processing devices.

In yet another embodiment the first and second processing devices may be at least one of a plurality of DMA engines, such as 102, 106, 110, or a plurality of SAS cores, such as 116 and 118.

Figure 2:
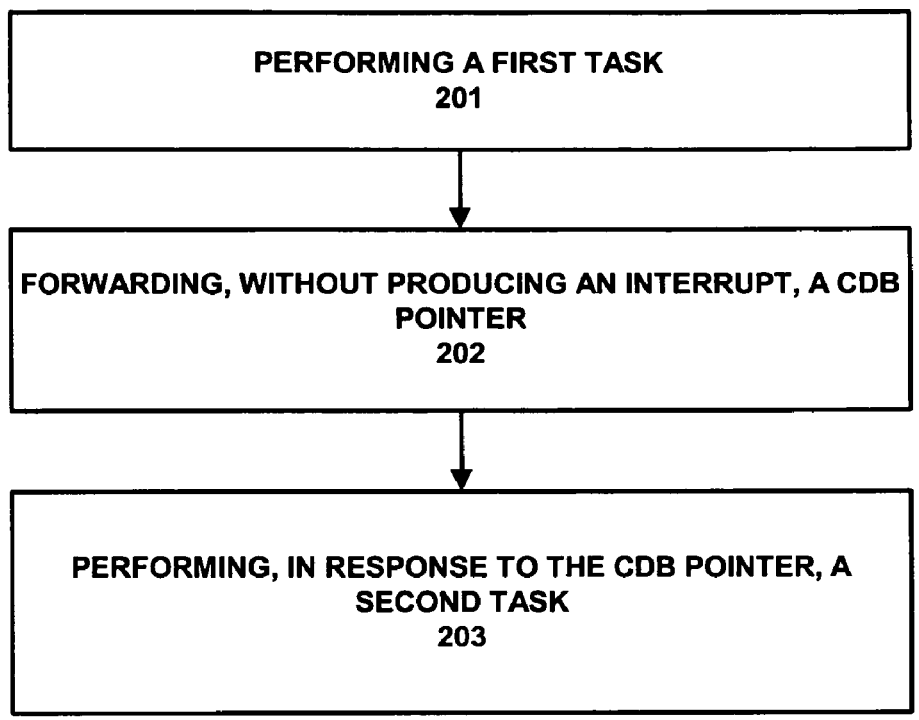
FIG. 2 is a representation of one exemplary process flow for improved RAID performance of the apparatus of FIG. 1.

FIG. 2 is a representation of one exemplary process flow for improved RAID performance of the apparatus of FIG. 1. The embodiment of this method as depicted in FIG. 2 may have the following steps: performing a first task with a first processing device (201); forwarding, without producing an interrupt, a Command Descriptor Block pointer from the first processing device to a second processing device when the first processing device finishes the first task (202); and performing, in response to the Command Descriptor Block pointer, a second task with the second processing device (203).

Figure 3:
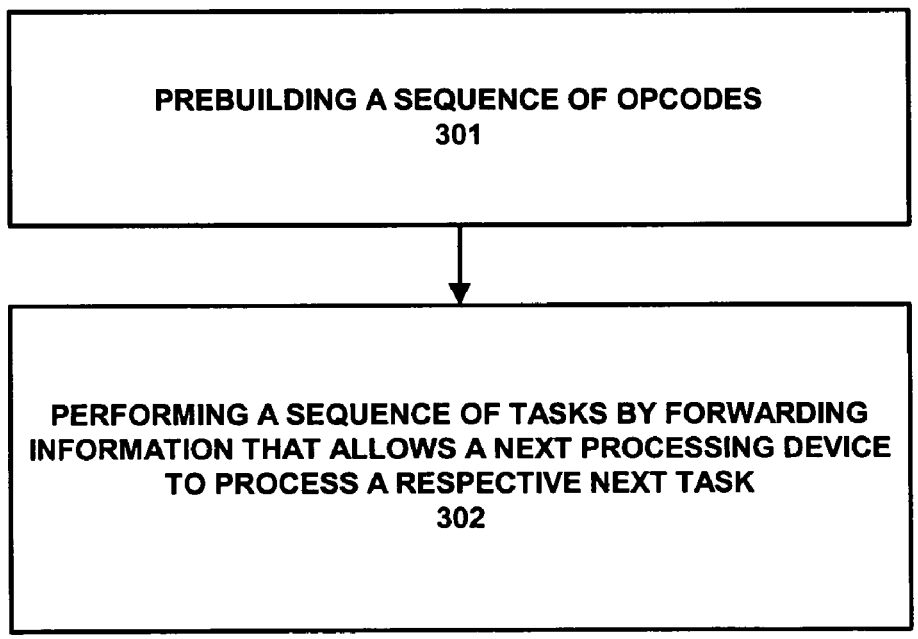
FIG. 3 is a representation of another exemplary process flow for improved RAID performance of the apparatus of FIG. 1.

FIG. 3 is a representation of another exemplary process flow for improved RAID performance of the apparatus of FIG. 1. The embodiment of this method as depicted in FIG. 3 may have the following steps: prebuilding a sequence of opcodes for the plurality of processing devices (301); performing a sequence of tasks with a plurality of processing devices by forwarding, when a respective processing device finishes a respective task thereof, from the respective processing device to a next processing device, predetermined information that allows the next processing device to process a respective next task (302).

In one embodiment of the present method and apparatus, a CDB opcode is defined that is a MOVE Immediate, which consists of data and a destination address rather than a typical MOVE, which consists of a source address, a destination address, and a count. The "MOVE Immediate" command is a command that informs the SAS core that it is time for the SAS core to begin its operation. This embodiment may use the MOVE Immediate in a manner that "data" is the CDB pointer to a next portion of the RAID operation, and "address" is a FIFO (First In First Out) location of a processing device.

In an alternate implementation the MOVE Immediate functionality, described above, may be added to other existing CDBs. When the primary function of the command completes then CDB pointer forwarding is performed, that is a CDB pointer is forwarded to a processing device. It is to be noted that the "Move Immediate" is an OP code that is only one example of a code that sends a message.

In yet another alternate implementation the traditional MOVE may be used such that the "source address" is a pointer to the CDB pointer and "destination address" is a FIFO location of a processing device.

One exemplary embodiment may be for a partial stripe write. The new parity calculation is shown below:

(New Parity)=(Old Parity)+(Old Data)+(New Data)

Figure 4:
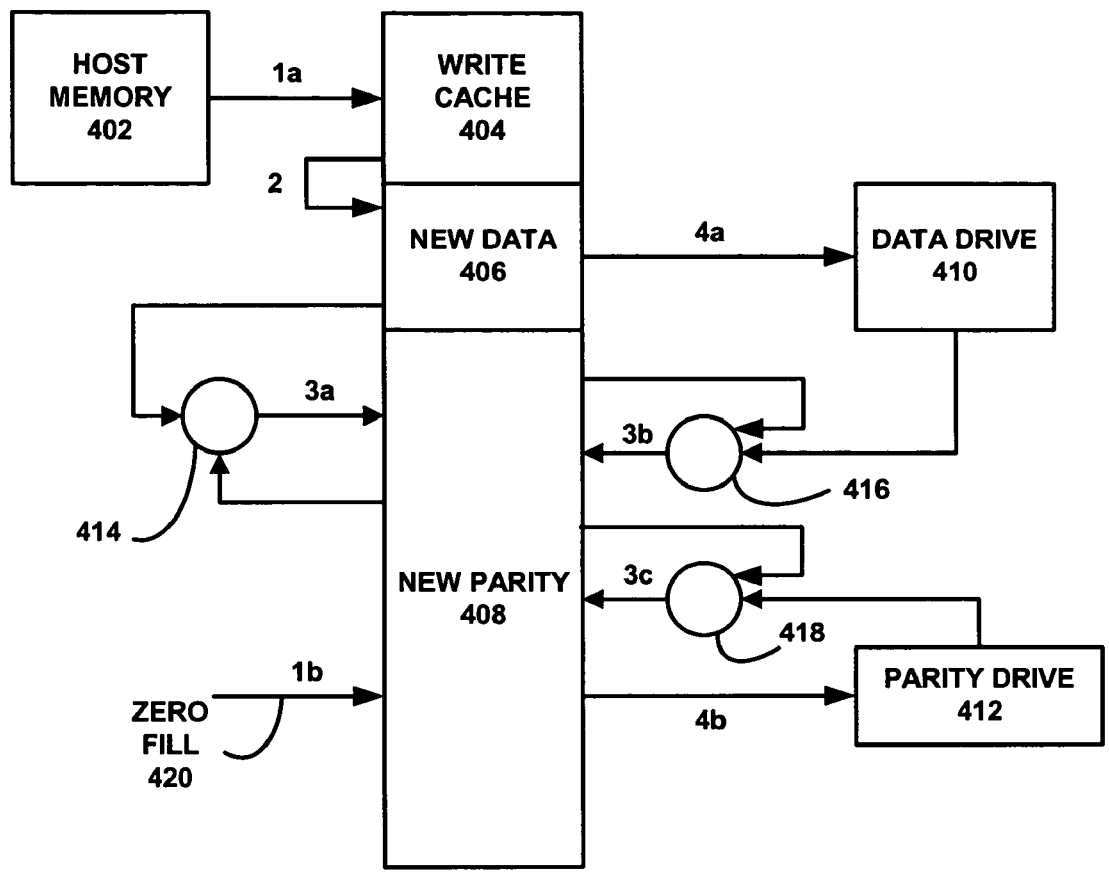
FIG. 4 depicts a data flow for a RAID 5 partial stripe write using write XOR without redundant controller.

The data flow for a RAID 5 partial stripe write using write XOR without redundant controller is shown in FIG. 4. This data flow also implies that the I/O (Input/Output) is sequential, yet the I/O or a number of I/O are not sufficiently large enough to complete a whole stripe. The FIG. 4 diagram and the FIG. 1 diagram may be used in conjunction with the examples set forth in Tables 1, 2, and 3.

In the FIG. 4 diagram a host memory 402 is operatively coupled to a write cache 404. The write cache 404 is coupled with new data 406. New data 406 is coupled with new parity 408 by XOR operation 414. The new data 406 is also coupled to data drive 410 that in turn is coupled to the new parity 408 via a XOR operation 416. A parity drive is also operatively coupled to the new parity 408 via a XOR operation 418. A zero fill 420 is also receivable by the new parity 408.

The host memory 402 may correspond to the host memory 172 in FIG. 1. Also, the write cache 404 may correspond to the read/write cache 160 in FIG. 1, and the data drive 410 may correspond to the hard drives 120, 122, 124 in FIG. 1.

Table 1 depicts a RAID 5 Write XOR Partial Stripe Write using a known method.

TABLE 1

| Step | Process |
|---|---|
| 1a | The CPU programs the DMA engine, i.e. builds a move CDB, to move data from the Host memory system to the Read/Write Cache in CPU memory. On completion of the DMA move, the DMA engine interrupts the CPU. |
| 1b | New Parity buffer is set to zero with the DMA Engine. |
| 2 | When the CPU is ready to write the data to the disk the New data is copied from the Read/Write Cache to New Data buffer in RAID memory with DMA engine by completing a move CDB. On completion of the DMA move the DMA engine interrupts the CPU. |

TABLE 1-continued

| Step | Process |
|---|---|
| 3a | New Data is XORed with New Parity buffer in RAID memory. This performed by the DMA engine doing a move operation with XOR. On completion of the DMA move the DMA engine interrupts the CPU. |
| 3b | Old Data is XORed with New Parity buffer in RAID memory by the CPU programming the SAS core to do a disk read, i.e. fills out a read CDB. On completion the SAS core interrupts the CPU. |
| 3c | Old Parity is XORed with New Parity buffer in Raid memory by the CPU programming the SAS core to do a disk read, i.e. fills out a read CDB. On completion the SAS core interrupts the CPU. |
| 4a | New Data is written to Data Drive by the RAID programming the SAS core to do a disk write, i.e. fills out a write CDB. On completion the SAS core interrupts the CPU. |
| 4b | New Parity is written to Parity Drive by the CPU programming the SAS core to do a disk write, i.e. fills out a write CDB. On completion the SAS core interrupts the CPU. |

In the known method depicted in Table 1 the CPU received 7 interrupts. Depicted in Table 2 is use of a method according to an embodiment of the present method. Using this method and preserving parallelism results in removing one interrupt or about 15 percent of the overhead.

TABLE 2

| Step | Process |
|---|---|
| 1a | The CPU programs the DMA engine, i.e. builds a move CDB, to move data from the Host memory system to the Read/Write Cache in RAID memory. On completion of the DMA move the DMA engine interrupts the CPU. |
| 1b | New Parity buffer is set to zero. |
| 2 | When the CPU is ready to write the data to the disk the New data is copied to New Data buffer in RAID memory with DMA engine by completing a move CDB. Additionally the CPU fills out the CDBs for steps 3a, 3b, and 3c. On completion of the DMA move for 2a, the DMA engine pushes the CDB pointer for operation 3a into the DMA engine submit queue, and pushes the CDB pointers for operations 3b and 3c into the SAS core submit queue. |
| 3a | New Data is XORed with New Parity buffer in RAID memory. This performed by the DMA engine doing a move operation with XOR. On completion of the DMA move the DMA engine interrupts the CPU. |
| 3b | Old Data is XORed with New Parity buffer in RAID memory by the CPU programming the SAS core to do a disk read, i.e. fills out a read CDB. On completion the SAS core interrupts the CPU. |
| 3c | Old Parity is XORed with New Parity buffer in RAID memory by the CPU programming the SAS core to do a disk read i.e. fills out a read CDB. On completion the SAS core interrupts the CPU. |
| 4a | New Data is written to Data Drive by the CPU programming the SAS core to do a disk write i.e. fills out a write CDB. On completion the SAS core interrupts the CPU. |

TABLE 2-continued

| Step | Process |
|---|---|
| 4b | New Parity is written to Parity Drive by the CPU programming the SAS core to do a disk write, i.e. fills out a write CDB. On completion the SAS core interrupts the CPU. |

In cases where interruption is a major problem the RAID 5 Write XOR Partial Stripe Write may be serialized even more to take advantage of the present method as shown in Table 3. The result here is a reduction from 7 interrupts to 2 interrupts.

TABLE 3

| Step | Process |
|---|---|
| 1a | The CPU programs the DMA engine (i.e. builds a move CDB) to move data from the Host memory system to the Read/Write Cache in RAID memory. On completion of the DMA move the DMA engine interrupts the CPU. |
| 1b | New Parity buffer is set to zero. |
| 2 | When the CPU is ready to write the data to the disk the New data is copied to New Data buffer in RAID memory with DMA engine (by completing a move CDB). Additionally the CPU fills out the CDBs for steps 3a, 3b, 3c, 4a, and 4b. On completion of the DMA move for 2, the DMA engine pushes the CDB pointer for operation 3a into the DMA engine submit queue. |
| 3a | New Data is XORed with New Parity buffer in RAID memory. This performed by the DMA engine doing a move operation with XOR. On completion of the DMA move for 3a, the DMA engine pushes the CDB pointer for operation 3b into the SAS core submit queue. |
| 3b | Old Data is XORed with New Parity buffer in RAID memory. On completion of the Disk read for 3b, the SAS core pushes the CDB pointer for operation 3c into the SAS core submit queue. |
| 3c | Old Parity is XORed with New Parity buffer in RAID memory. On completion of the Disk read for 3c, the SAS core pushes the CDB pointer for operation 4a into the SAS core submit queue. |
| 4a | New Data is written to Data Drive. On completion of the Disk read for 4a, the SAS core pushes the CDB pointer for operation 4b into the SAS core submit queue. |
| 4b | New Parity is written to Parity Drive. On completion the SAS core interrupts the CPU. |

Furthermore, as described above, in one embodiment the DMA engine when it gets to the move immediate command writes to an address a specific piece of data which is the address of the FIFO of the SAS core, which is effectively submitting a new command to the SAS core. This new command may be a pointer which points to a CDB in memory which provides the SAS core with operations, such as writing and reading to memory. This is an example of using the move immediate command to eliminate the interrupt of the CPU when operation is transferred from the DMA engine to the SAS core.

In another embodiment, the move immediate command is combined with another CDB format, such as an additional field in the move immediate command. When the DMA engine finishes the move immediate command, it checks the additional field. When the field is not zero, the DMA engine causes the SAS core to begin execution.

The steps or operations described herein are just exemplary. There may be many variations to these steps or operations without departing from the spirit of the invention. For instance, the steps may be performed in a differing order, or steps may be added, deleted, or modified. Also for example, in one embodiment of the present method and apparatus, there may be three CDBs. The first CDB is for the first data move from memory to a temporary buffer. The temporary buffer is usually in memory. The second CDB is for the DMA engine and indicates that this is a move immediate. The DMA engine will then send a message to the SAS core that the SAS core may proceed, which is the third CDB. The SAS core will perform its function and when it is finished will send an interrupt to the CPU.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus comprising:
a CPU (Central Processing Unit), at least first and second processing devices and a RAID (Redundant Array of Independent Disks), wherein the RAID, the CPU, and the at least first and second processing devices are operatively coupled to each other via a bus, and wherein each of the at least first and second processing devices comprise one of: a Direct Memory Access (DMA) engine and a Serial Attached SCSI (Small Computer System Interface) (SAS) core respectively, only DMA engines, or only SAS cores, and wherein the first and second processing devices to process at least one sequence of RAID processes, and wherein the at least one sequence having a command forward instruction that enables pushing a Command Descriptor Block (CDB) pointer to the second processing device, and wherein after the first processing device completes processing a first process of the at least one sequence of RAID processes, the first processing device forwards the command forward instruction that pushes the CDB pointer to the second processing device to affect processing of the second process of the at least one sequence of RAID processes without interrupting the CPU, and wherein the CDB pointer comprises pointer to tasks to be processed in the second process.

2. The apparatus according to claim 1, wherein the first processing device is a DMA engine, and wherein the second processing device is a SAS core.

3. The apparatus according to claim 1, wherein the first and second processing devices comprise at least one of a plurality of DMA engines or a plurality of SAS cores.

4. A method comprising:
performing a first RAID (Redundant Array of Independent Disks) task with a first processing device;
forwarding, when the first processing device finishes the first RAID task, a command forward instruction that pushes a Command Descriptor Block (CDB) pointer from the first processing device to a second processing device to affect processing of a second RAID task without interrupting a Central Processing Unit (CPU), wherein the CDB pointer comprises pointer to tasks to be processed by the second processing device; and
performing, in response to the command forward instruction having the CDB pointer, the second RAID task associated with the CDB pointer by the second processing device, wherein each of the at least first and second processing devices comprise one of a Direct Memory Access (DMA) engine or a Serial Attached SCSI (Small Computer System Interface) (SAS) core, and wherein the at least first and second processing devices are operatively coupled to a RAID and the CPU via a bus.

5. The method according to claim 4, wherein the first processing device is a DMA engine, and wherein the second processing device is a SAS core.

6. The method according to claim 4, wherein the first and second processing devices comprise at least one of a plurality of DMA engines or a plurality of SAS cores.

7. A method, comprising:
performing a sequence of RAID (Redundant Array of Independent Disks) tasks with a plurality of processing devices by forwarding, when a respective processing device finishes a respective RAID task in the sequence of RAID tasks thereof, a command forward instruction that pushes at least one Command Descriptor Block (CDB) pointer to a next processing device to affect processing of a respective next RAID task in the sequence of RAID tasks without interrupting a Central Processing Unit (CPU), and wherein the at least one CDB pointer comprises pointer to tasks to be processed in a respective RAID task, and wherein each of the processing devices comprises one of a Direct Memory Access (DMA) engine or a Serial Attached SCSI (Small Computer System Interface) (SAS) core, and wherein each of the processing devices are operatively coupled to a RAID and the CPU via a bus, and wherein the sequence of RAID tasks is a First In First Out (FIFO) having a sequence of CDB's.

8. The method according to claim 7, wherein the method further comprises prebuilding a sequence of opcodes for the plurality of processing devices, the sequence of opcodes including at least one opcode that is a Command Descriptor Block (CDB) pointer forwarding opcode.

9. The method according to claim 7, wherein at least one of the processing devices is a DMA engine, and wherein at least another of the processing devices is a SAS core.

10. The method according to claim 7, wherein the processing devices comprise at least one of a plurality of DMA engines or a plurality of SAS cores.

11. The method according to claim 7, wherein each of the at least first and second processing devices comprise: one of a DMA engine and a SAS core respectively, only DMA engines, or only SAS cores.

12. The method according to claim 7, wherein each of the at least first and second processing devices comprise a respective DMA engine.

13. The method according to claim 7, wherein each of the at least first and second processing devices comprise a respective SAS engine.

14. An apparatus comprising:
means for performing a first RAID (Redundant Array of Independent Disks) task of at least one sequence of RAID tasks with a first processing device;
means for forwarding, when the first processing device finishes the first RAID task, a command forward instruction that pushes a Command Descriptor Block (CDB) pointer from the first processing device to a second processing device to affect processing of a second RAID task without interrupting a Central Processing Unit (CPU), wherein the CDB pointer comprises pointer to tasks to be processed by the second processing device; and means for performing, in response to the command forward instruction having the CDB pointer, the second RAID task of the at least one sequence of RAID tasks associated with the CDB pointer by the second processing device, wherein each of the at least first and second processing devices comprise one of a Direct Memory Access (DMA) engine or a Serial Attached SCSI (Small Computer System Interface) (SAS) core, and wherein each of the at least first and second processing devices is operatively coupled to a RAID and the CPU via a bus.

15. The apparatus according to claim 14, wherein the first processing device is a DMA engine, and wherein the second processing device is a SAS core.

\* \* \* \* \*